United States Patent [19]
Dey

[11] 3,808,052
[45] Apr. 30, 1974

[54] ORGANIC ELECTROLYTE CELL EMPLOYING MOLYBDENUM OXIDE CATHODIC ELECTRODE

[76] Inventor: Arabinda N. Dey, 53 St. Mart St., Needham, Mass. 02161

[22] Filed: Aug. 27, 1969

[21] Appl. No.: 853,312

[52] U.S. Cl. .................................. 136/20, 136/100
[51] Int. Cl. .......................................... H01m 35/02
[58] Field of Search ............ 136/100, 20, 155, 153, 136/86, 120

[56] References Cited
UNITED STATES PATENTS

| | | | |
|---|---|---|---|
| 3,043,896 | 7/1962 | Herbert et al. | 136/6 LN |
| 3,414,438 | 12/1968 | Lindholm et al. | 136/86 D |
| 3,480,479 | 11/1969 | Nestor | 136/86 D |
| 3,492,164 | 1/1970 | Wolfe, Jr. | 136/86 D |
| 3,505,118 | 4/1970 | Mehr et al. | 136/86 D |
| 3,073,884 | 1/1963 | Pinkerton | 136/100 |
| 3,380,855 | 4/1968 | Mahy et al. | 136/100 |
| 3,413,154 | 11/1968 | Rao | 136/100 |

OTHER PUBLICATIONS

NASA, July 1963–Sept. 1964, Research and Development of a High Capacity Nonaqueous Secondary Battery, Hill & Selino, pp. 1, 2, 109, 110.

*Primary Examiner*—A. B. Curtis
*Assistant Examiner*—C. F. Lefevour
*Attorney, Agent, or Firm*—Robert Levine

[57] ABSTRACT

Cathodic electrodes incorporating molybdenum trioxide ($MoO_3$) active cathode material, methods of preparation thereof and organic electrolyte cells employing light metal anodes in combination therewith. A preferred preparation method is disclosed wherein an $MoO_3$ cathode is produced by pyrolytic decomposition of a mixture incorporating a molybdenum salt, wherein the molybdenum is hexavalent. Cells exhibiting high energy density, extended shelf life, relatively constant output voltage and good current capability are also disclosed.

5 Claims, 2 Drawing Figures

ORGANIC ELECTROLYTE CELL EMPLOYING MOLYBDENUM OXIDE CATHODIC ELECTRODE

BACKGROUND OF THE INVENTION

This invention relates to cathodic electrodes having molybdenum trioxide active cathode material, to a method for preparing such electrodes in highly porous and efficient structure and to organic electrolyte cells employing molybdenum trioxide cathodes and light metal anodes.

In the transition from aqueous electrolytes to organic electrolytes in electrochemical cells, a distinct advantage has been achieved in cell gravimetric energy density, customarily measured in watt-hours per pound of cell active constituents. A substantial factor enabling such advantage is the suitability for use in organic electrolytes of anode-cathode pairs having high electrochemical potential difference which would decompose an aqueous electrolyte and totally diminish cell capacity. Thus, highly electropositive metals, such as the light metals, have found recent application as anodes in organic electrolyte cells. Low equivalent weight active cathode materials in combination with such anodes have provided cells with high voltage and high energy density. However, there remain in these advantageous electrode combinations such problems as solubility of active cathode material in the organic electrolyte, reactivity of the cathode and electrolyte, inefficient utilization of active cathode material and polarization tendencies. Limited shelf life and low practical realization of theoretically high gravimetric energy density ensue where such problems are present.

Beyond the basic cell and electrode considerations discussed above, certain application requirements further limit the suitability of organic electrolyte cells even where cell characteristics of high voltage and high energy density are provided along with compatible constituent selection avoiding the above-mentioned problems. One such application of frequent occurrence is that the cell provide relatively steady output voltage throughout its useful life.

In the present invention these various desired characteristics are provided to an extent heretofore unrealized in organic electrolyte cells.

SUMMARY OF THE INVENTION

It is an object of this invention to provide cathodic electrodes having active cathode material particularly suited for use in organic electrolyte cells.

It is a further object of this invention to provide a method of preparation of highly efficient cathodic electrodes of this type having a high degree of porosity.

It is an additional object of this invention to provide organic electrolyte cells having high practical energy density, extended shelf life and high utilization efficiency of active cathode material.

It is a further object of this invention to provide organic electrolyte cells exhibiting relatively constant output voltage throughout cell useful life.

In the attainment of the first-stated object, applicant has determined molybdenum trioxide to constitute superior active material for cathodic electrodes in organic electrolyte cells. Whereas cathodes prepared by direct use of powdered $MoO_3$ have been found to provide entirely satisfactory utilization efficiencies, in the attainment of the second-stated object, higher utilization efficiencies and substantially greater porosity is provided by a preparation method involving the pyrolytic decomposition of a mixture of particulate inert conductive matter and molybdenum salts wherein the molybdenum is hexavalent.

In respect of the other stated objects, cells are provided having a light metal anode, a cathode the active material of which is molybdenum trioxide and an organic electrolyte comprising a light metal salt and an organic solvent selected from the group consisting of tetrahydrofuran, propylene carbonate, dimethyl sulfite, N-nitrosodimethylamine, $\gamma$-butyrolactone, N:N dimethyl formamide, dimethyl sulfoxide, dimethyl carbonate, methyl formate, butyl formate and acetonitrile, and mixtures thereof.

The above and other objects and features of the invention will be evident from the following detailed description thereof taken in conjunction with the accompanying drawings.

DESCRIPTION OF THE PREFERRED EMBODIMENTS

Cathodic electrodes having $MoO_3$ active cathode material may be prepared in a first preparation method by direct mixture of powdered molybdenum trioxide and inert particulate matter of higher conductivity than molybdenum trioxide, such as carbon or graphite. The weight ratio of the mixture constituents may be between 9:1 to 6:4, and preferably seven parts $MoO_3$ to three parts conductive particulate matter. In accordance with conventional cathodic electrode fabrication techniques, such initial mixture may be pelletized by pressing at 10,000 lbs. per in². and the pellets may be subjected to grinding to form particles of relatively course granularity. These particles are then pressed into a suitable cathode container under pressure, e.g. 70,000 lbs. per in².

In evaluating cathodic electrodes so prepared, the cathode container is assembled in an organic electrolyte cell by laying thereupon a thin separator comprised of a layer of microporous material, such as filter paper, fiberglass, or like material, chemically inert to the cell active constituents. Next, an electrolyte absorbent is placed upon the separator, the absorbent, e.g., cotton, being impregnated with a one molar solution of lithium perchlorate $LiClO_4$ dissolved in tetrahydrofuran (THF). The cell anode, lithium metal, is laid upon the absorbent and cell assembly is completed by use of a further container adapted to cooperate with the cathode container to maintain the cell electrodes electrically insulated from one another and all adjacent cell layers in firm relative contact. The details of this type of cell construction are illustrated in U.S. Pat. Nos. 2,712,565 and 3,096,217.

In this cell, the cathode reaction is presumed to be:

$$MoO_3 + 2Li^+ + 2e^- \rightleftarrows MoO_2 + Li_2O$$

Figure 1:
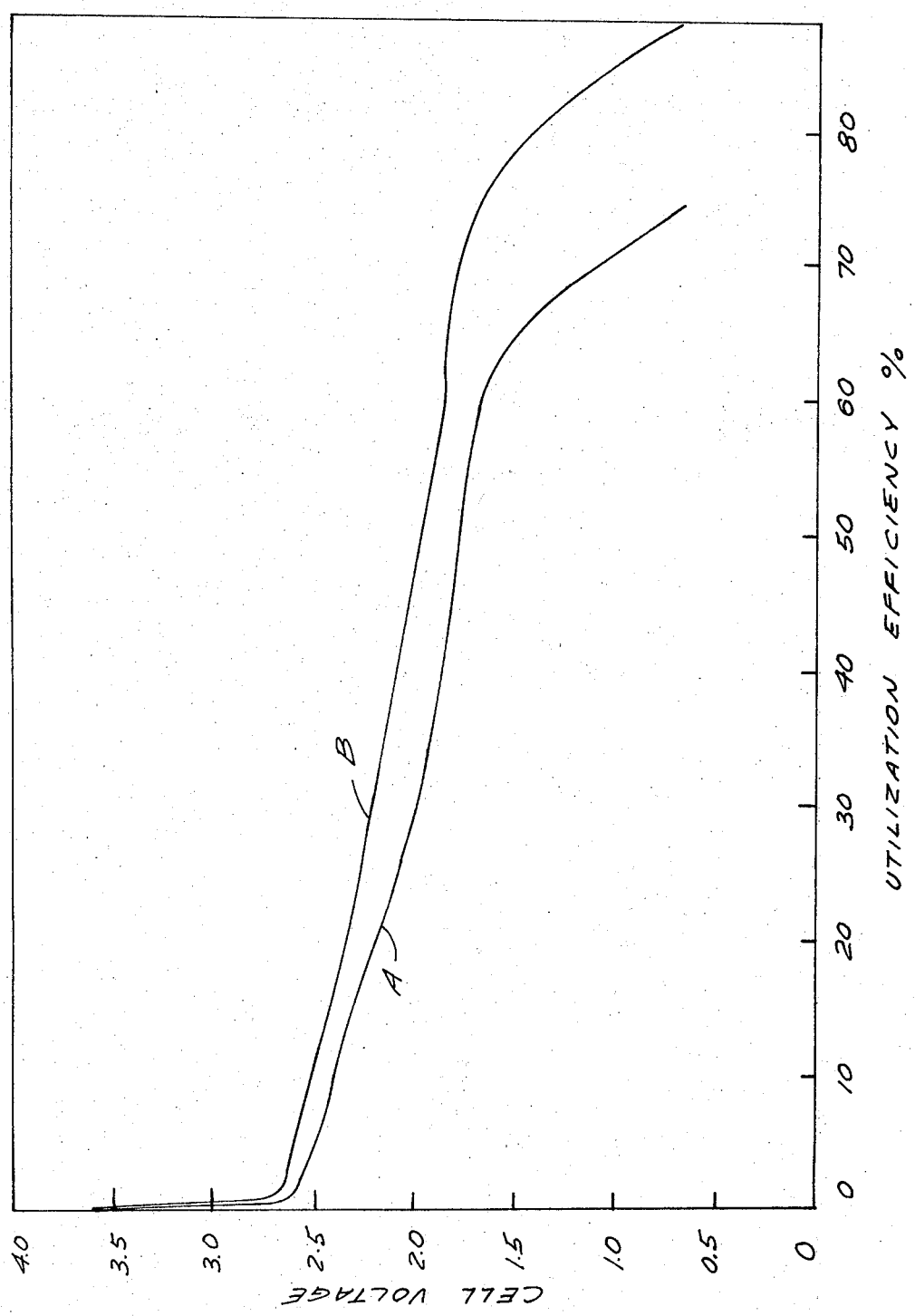
FIG. 1 illustrates the discharge characteristics of light metal anode organic electrolyte cells, indicating the utilization efficiencies of cell cathodes having molybdenum trioxide active cathode material.

The discharge characteristic shown as Curve (A) of FIG. 1, indicates the cell to have an open circuit voltage of 3.6 volts which decreased sharply to 2.6 volts upon loading at a current density of 1 ma/cm², based on the apparent area of the cathode exposed to the anode and remains relatively constant thereafter. By constancy in this respect is meant the absence of any abrupt deviations in output voltage throughout discharge. This steadiness is further seen in that cell output voltage decreases only 0.7 volt during the period of approximately 60 percent utilization. Cathode utilization efficiency is 65 percent, based upon two electron reduction of $MoO_3$, up to cell output voltage of 1.5 volts.

In a second preparation method, cathodic electrodes are prepared by direct mixture of powdered molybdenum trioxide, inert particulate matter of higher conductivity than molybdenum trioxide and organic or inorganic binder material insoluble in the cell organic solvent. The first two mixture constituents are admixed and the binder is added in an amount of from one to ten percent of the weight of that mixture. The ratio of $MoO_3$ to particulate conductive matter can be varied from 10:1 to 1:1. Exemplary organic binder materials are colloidal Teflon, polyethylene dissolved in xylene and ethyl cellulose dissolved in xylene. Typical inorganic binder materials are plaster of paris and water soluble alkali metal silicates.

In a preferred practice of this method, powdered molybdenum trioxide and graphite are first mixed in a weight ratio of 7:3 and 3 percent by weight of an aqueous dispersion of polytetrafluoroethylene, sometimes referred to as colloidal Teflon, is mixed therewith to form a composite mixture. An organic solvent such as isopropanol is then added to the composite mixture to form a paste in the form of a pliable dough. The dough is then placed upon a current collector, such as an expanded metallic screen, which is in turn placed in a die, where pressure of from 10,000 to 150,000 lbs/in² is applied to the dough and excess isopropanol is squeezed therefrom. A compact cathode is provided having suitable mechanical integrity for use, further improvement in mechanical integrity being provided by air-drying same and curing at a temperature of from 100°C to 400°C. Preferably, this preparation method is practiced with molding pressure of 40,000 lbs/in² and with the curing step, curing temperature being 300°C for approximately 2 hours.

Figure 2:
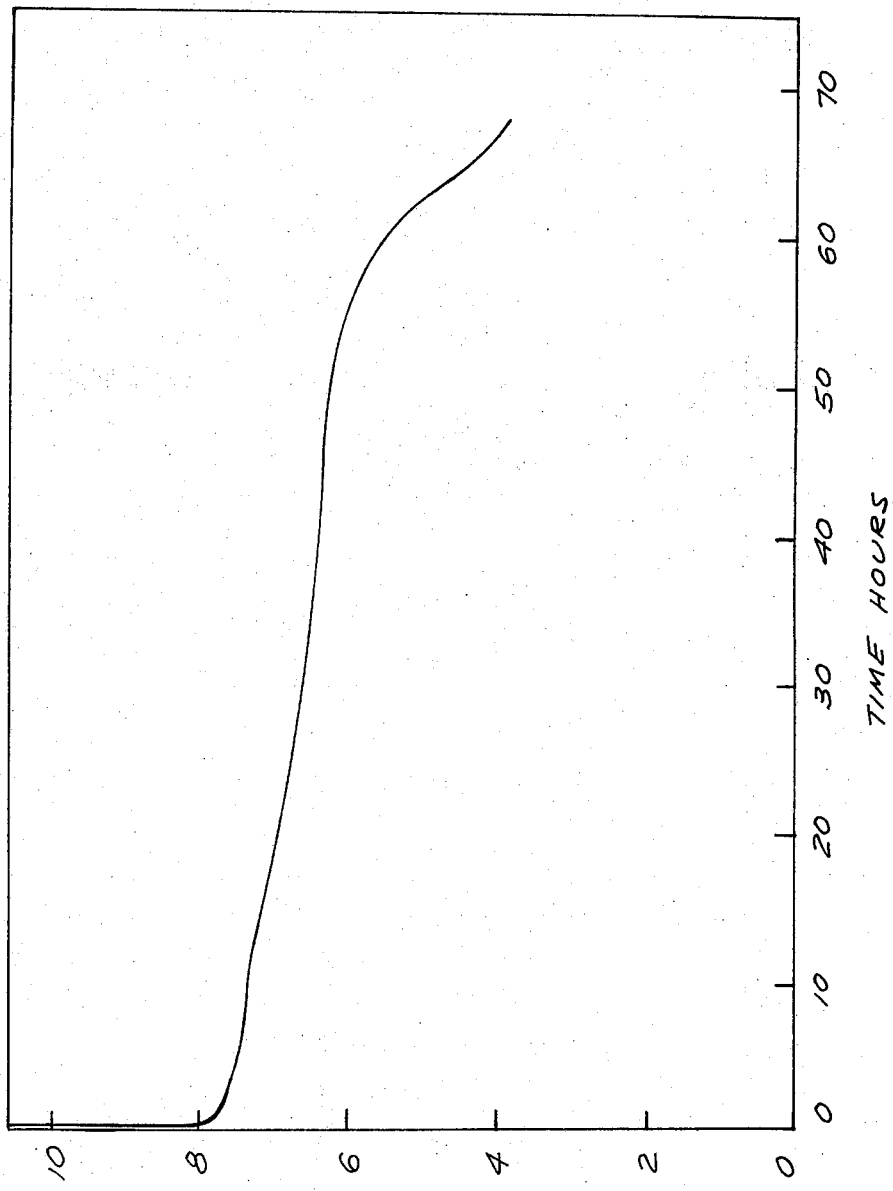
FIG. 2 illustrates the discharge characteristic of a battery comprised of multiple such cells, indicating battery useful life and output voltage constancy with time.

In evaluating cathodes prepared by this method, cells were constructed by employing two rectangular lithium anodes, prepared by pressing 0.02 inch thick lithium foil on expanded stainless steel, on alternate sides of the cathode with a filter paper separator interposed between the cathode and each anode. An electrolyte containing a one molar solution of lithium perchlorate in tetrahydrofuran was added to the cell which was then encased. The voltage versus time characteristic of a battery comprised of three such cells connected in series and of size in accordance with the NEDA-1604 specification, is illustrated in FIG. 2. With discharge at a constant current of 15 ma., 0.98 ampere-hour was provided by the battery, a recovered capacity of two to three times that obtainable from like-sized commercial NEDA-1604 transistor radio batteries discharged in the same manner. The practical realized energy density of the battery, 135 watt-hours per pound, is considerably superior to all existing commercial batteries, and represents a substantial realization of the theoretical gravimetric energy density calculated for the lithium-molybdenum oxide system to be 556 watthours per pound.

Whereas both of the above preparation methods involve the direct use of molybdenum trioxide powder, a further preparation method involving starting material other than $MoO_3$ and effective to produce $MoO_3$ electrodes of substantially improved porosity and utilization efficiencies will now be discussed.

In this method, a mixture is formed of a powdered starting material and an inert particulate material of higher conductivity than $MoO_3$. Binder material may be added thereto if desired. The mixture may be compacted by pelletizing and ground and further subjected to forming pressurization as discussed in connection with the above preparation methods. The formed mixture is then subjected to pyrolysis to produce a highly porous electrode having $MoO_3$ active material.

The starting material may be any molybdenum salt wherein the molybdenum is hexavalent. Typical salts are ammonium molybdate and the alkali metal molybdates, i.e. lithium, sodium or potassium molybdate. The conductive particulate matter may be carbon, graphite, etc. Where a binder is used, any of the above discussed organic and inorganic binders are usable.

In the preferred practice of this method, the mixture is comprised of nine parts of ammonium molybdate and one part graphite to which is added 3 percent by weight of colloidal Teflon. The formed mixture is pyrolyzed in an oven at 400°C for three hours. The pyrolysis reaction is:

$$(NH_4)_6 Mo_7 O_{24} \rightleftarrows 7MoO_3 + 6NH_3 + 3H_2O$$

The cathodic electrode resulting from such pyrolysis comprises a mass of molybdenum trioxide having graphite dispersed therein. The reaction products of ammonia gas and water vapor escape to the atmosphere, leaving the mass with very high void volume as escapement occurs. Since curing is obtained simultaneously with pyrolysis, further heat treatment of the electrode is unnecessary.

In evaluating cathodic electrodes prepared by this method, Li-$MoO_3$ organic electrolyte cells were constructed as in the case of the two preceding electrode evaluations. The electrolyte was comprised of a one molar solution of lithium perchlorate in tetrahydrofuran. A substantial improvement in utilization efficiency of the cell cathode by reason of increased porosity of the surface area thereof is shown in the discharge characteristic of the cell in FIG. 1, Curve (B). As is therein illustrated approximately 80 percent of the cathode material was consumed in cell operation before cell output voltage decreased to 1.5. In contrast, the molybdenum trioxide cathode prepared by use of powdered $MoO_3$, as illustrated in Curve (A), exhibited a utilization efficiency of somewhat less than 70 percent.

Further improvement in cell operating characteristics attending the presently discussed cathode preparation method is evident in FIG. 1. Somewhat increased output voltage at load and substantially greater cell output voltage constancy are provided. In this respect, cell output voltage under load decreases only 0.7 volts over approximately 70 percent of cell useful life.

Cathodic electrodes prepared in accordance with each of the three distinct preparation methods exhibit substantial insolubility in organic solvents employable in cells constructed in accordance with the invention, i.e. tetrahydrofuran, propylene carbonate, dimethyl sulfite, N-nitrosodimethylamine, γ-butyrolactone, N:N dimethyl formamide, dimethyl sulfoxide, dimethyl carbonate, methyl formate, butyl formate and acetonitrile, and mixtures thereof. Thus, extended shelf life is characteristic of the cells of the invention.

Apart from the particular electrolyte salt discussed above in the several evaluations of $MoO_3$ cathodes, i.e., lithium perchlorate, other suitable electrolytes may be provided by dissolving organic or inorganic salts of light metals in the above-mentioned organic solvents. Typical light metal salts include light metal perchlorates, tetrachloroaluminates, tetrafluoborates, chlorides, hexafluophosphates and hexafluoarsenates.

By the term "light metals" is meant alkali metals, alkaline earth metals including magnesium and beryllium, and aluminum.

What is claimed is:

1. An electrochemical cell comprising a light metal anode, an organic electrolyte and a cathode having molybdenum trioxide active cathode material.

2. The cell claimed in claim 1 wherein said organic electrolyte comprises a metallic salt and an organic solvent selected from the group consisting of tetrahydrofuran, propylene carbonate, dimethyl sulfite, N-nitrosodimethylamine, γ-butyrolactone, N:N dimethyl formamide, dimethyl sulfoxide, dimethyl carbonate, methyl formate, butyl formate and acetonitrile, and the mixtures thereof.

3. The cell claimed in claim 2 wherein said metallic salt is a light metal salt.

4. An electrochemical cell comprising a lithium anode, an organic electrolyte comprised of lithium perchlorate in tetrahydrofuran and a cathode having molybdenum trioxide active cathode material.

5. The cell claimed in claim 4 wherein said organic electrolyte comprises a one molar solution of lithium perchlorate in tetrahydrofuran.

* * * * *

UNITED STATES PATENT OFFICE
CERTIFICATE OF CORRECTION

Patent No. 3,808,052  Dated April 30, 1974

Inventor(s) Arabinda N. Dey

It is certified that error appears in the above-identified patent and that said Letters Patent are hereby corrected as shown below:

On the title page column 1, after line 5 insert:

-- Assignee: P.R. Mallory & Co., Inc., Indianapolis, Ind. --

Signed and Sealed this

Twenty-fourth Day of August 1976

[SEAL]

Attest:

RUTH C. MASON
*Attesting Officer*

C. MARSHALL DANN
*Commissioner of Patents and Trademarks*